United States Patent
Shima et al.

(10) Patent No.: US 10,210,400 B2
(45) Date of Patent: Feb. 19, 2019

(54) EXTERNAL-ENVIRONMENT-RECOGNIZING APPARATUS

(71) Applicant: Hitachi Automotive Systems, Ltd., Hitachinaka-shi, Ibaraki (JP)

(72) Inventors: Takeshi Shima, Tokyo (JP); Toshiyuki Aoki, Tokyo (JP); Haruki Matono, Tokyo (JP); Tatsuhiko Monji, Hitachinaka (JP); Rikiya Kashimura, Hitachinaka (JP); Yasuto Arakaki, Hitachinaka (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 199 days.

(21) Appl. No.: 15/303,228

(22) PCT Filed: Mar. 25, 2015

(86) PCT No.: PCT/JP2015/059023
§ 371 (c)(1),
(2) Date: Oct. 11, 2016

(87) PCT Pub. No.: WO2015/163078
PCT Pub. Date: Oct. 29, 2015

(65) Prior Publication Data
US 2017/0039434 A1 Feb. 9, 2017

(30) Foreign Application Priority Data
Apr. 24, 2014 (JP) .................................. 2014-090494

(51) Int. Cl.
*G06K 9/62* (2006.01)
*G06K 9/00* (2006.01)
(Continued)

(52) U.S. Cl.
CPC ......... *G06K 9/00791* (2013.01); *B60W 30/09* (2013.01); *B60W 50/14* (2013.01);
(Continued)

(58) Field of Classification Search
None
See application file for complete search history.

(56) References Cited

U.S. PATENT DOCUMENTS

2005/0226508 A1* 10/2005 Gotohda ............ G06K 9/00362
382/190
2006/0164514 A1 7/2006 Muramatsu et al.
(Continued)

FOREIGN PATENT DOCUMENTS

| CA | 2 349 519 C | 8/2011 |
| CN | 102745160 A | 10/2012 |

(Continued)

OTHER PUBLICATIONS

International Search Report (PCT/ISA/210) issued in PCT Application No. PCT/JP2015/059023 dated Jul. 7, 2015 with English translation (5 pages).
(Continued)

*Primary Examiner* — Christopher G Findley
(74) *Attorney, Agent, or Firm* — Crowell & Moring LLP

(57) ABSTRACT

The objective of the present invention is to obtain an external environment-recognizing apparatus with which it is possible to obtain detection results having a necessary accuracy when a plurality of target objects from a captured image are detected. This external-environment-recognizing apparatus has: a plurality of processing units for processing an image; a recognition application-storing unit for storing, by object type, a plurality of recognition applications for recognizing an object by processing using at least one processing unit among the plurality of processing units; an
(Continued)

external-information-acquiring unit for acquiring external information that includes at least external environmental information or vehicle behavior information; and a selecting unit for selecting at least one recognition application from the recognition-application-storing unit, and for selecting, on the basis of the external information, a processing unit among the plurality of processing units for processing the selected recognition application.

12 Claims, 11 Drawing Sheets

(51) Int. Cl.

| | | |
|---|---|---|
| *G06T 1/00* | (2006.01) | |
| *G08G 1/16* | (2006.01) | |
| *H04N 7/18* | (2006.01) | |
| *B60W 30/09* | (2012.01) | |
| *B60W 50/14* | (2012.01) | |
| *G05D 1/02* | (2006.01) | |
| *G06T 1/20* | (2006.01) | |
| *H04N 13/239* | (2018.01) | |

(52) U.S. Cl.
 CPC ......... *G05D 1/0251* (2013.01); *G06K 9/6267* (2013.01); *G06T 1/00* (2013.01); *G06T 1/20* (2013.01); *G08G 1/16* (2013.01); *H04N 7/18* (2013.01); *H04N 7/181* (2013.01); *H04N 13/239* (2018.05); *B60W 2050/143* (2013.01); *B60W 2050/146* (2013.01); *G06T 2200/16* (2013.01)

(56) References Cited

U.S. PATENT DOCUMENTS

| | | | |
|---|---|---|---|
| 2007/0229238 A1* | 10/2007 | Boyles | G06K 9/00369 340/435 |
| 2011/0115615 A1* | 5/2011 | Luo | B60R 1/00 340/436 |
| 2012/0216208 A1 | 8/2012 | Takemura et al. | |
| 2012/0269391 A1 | 10/2012 | Saito | |
| 2013/0060522 A1 | 3/2013 | Dirndorfer et al. | |
| 2013/0308825 A1 | 11/2013 | Yamazaki | |
| 2013/0322691 A1 | 12/2013 | Guan | |
| 2014/0028873 A1 | 1/2014 | Higuchi et al. | |
| 2015/0235093 A1 | 8/2015 | Shima et al. | |

FOREIGN PATENT DOCUMENTS

| | | |
|---|---|---|
| CN | 103443823 A | 12/2013 |
| CN | 103448650 A | 12/2013 |
| EP | 2 346 014 A1 | 7/2011 |
| JP | 7-302325 A | 11/1995 |
| JP | 2005-242759 A | 9/2005 |
| JP | 2010-224670 A | 10/2010 |
| JP | 2011-100338 A | 5/2011 |
| JP | 2012-222762 A | 11/2012 |
| WO | WO 2005/006756 A1 | 1/2005 |
| WO | WO 2014/050286 A1 | 4/2014 |

OTHER PUBLICATIONS

Japanese-language Written Opinion (PCT/ISA/237) issued in PCT Application No. PCT/JP2015/059023 dated Jul. 7, 2015 (5 pages).
Saito, Toru et al., "Development of Software for the Driving Assist System with the Stereo Camera", The 14$^{th}$ Image Sensing Symposium in Yokohama, Jun. 2008, Digest IN2-14, pp. 1-4, with English translation (13 pages).
Otsuka, Yugi et al. "Vehicle Detection Technology Using Method of Feature Space Projection of Edge Pair", View 2005 Vision Engineering Workshop, 2005, pp. 160-165, with English Translation (22 pages).
Kiyohara, Masahiro et al. "Development of Moving Object Detection around Vehicle", View Vision Engineering Workshop, 2011, pp. 275-280, with English translation (20 pages).
Extended European Search Report issued in counterpart European Application No. 15782468.1 dated Oct. 30, 2017 (12 pages).
Franke et al., "From door to door—principles and applications of computer vision for driver assistant systems", Intelligent Vehicle Technologies: Theory and Applications, 2001, pp. 131-188 (60 pages total), Butterworth-Heinemann, Oxford, XP-002606561.
Chinese-language Office Action issued in counterpart Chinese Application No. 201580019482.8 dated May 3, 2018 with English translation (thirty-one (31) pages).

* cited by examiner

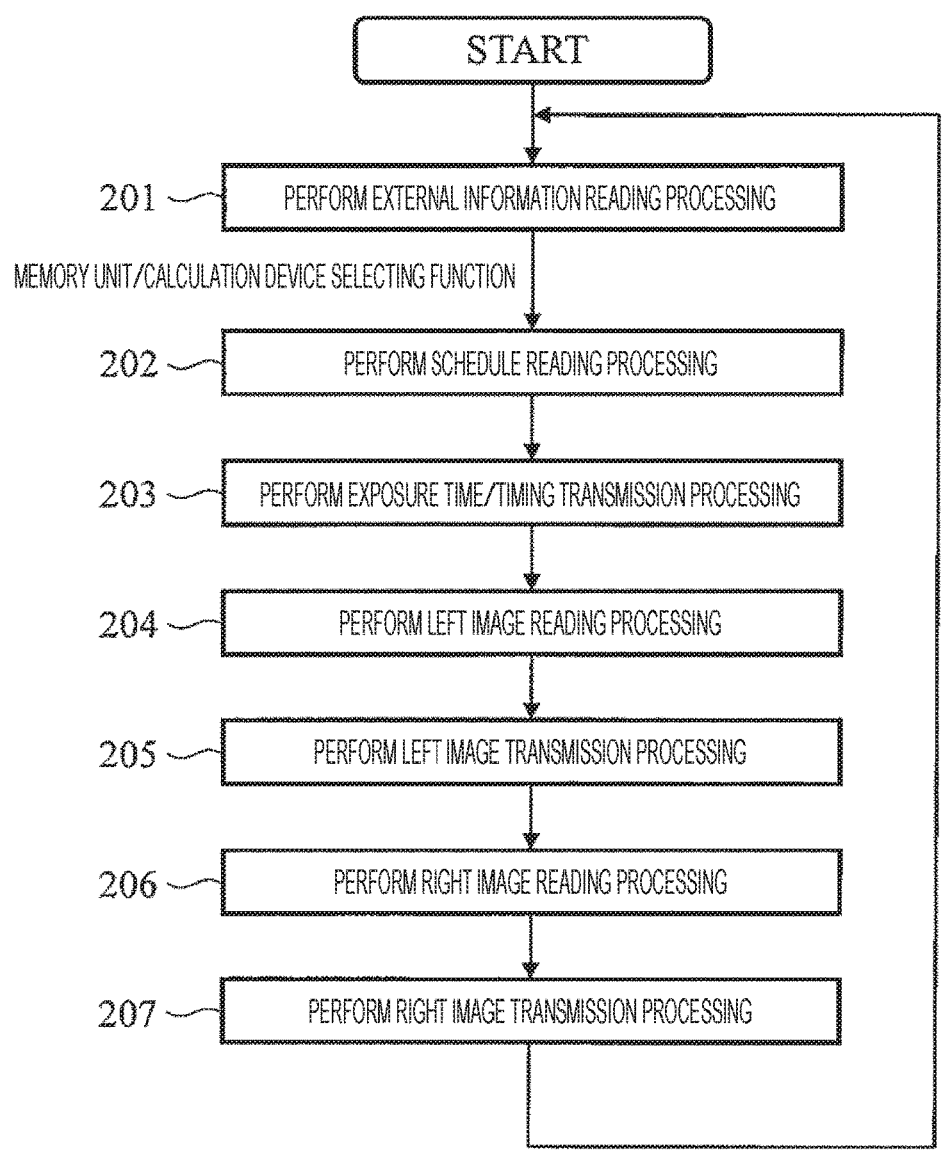

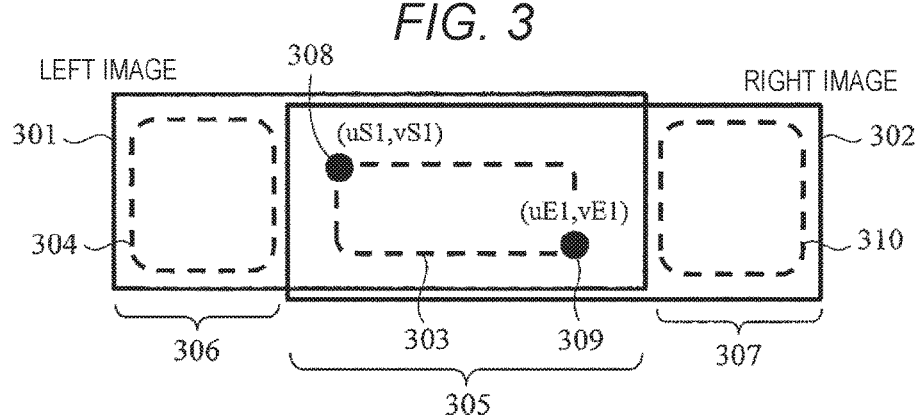
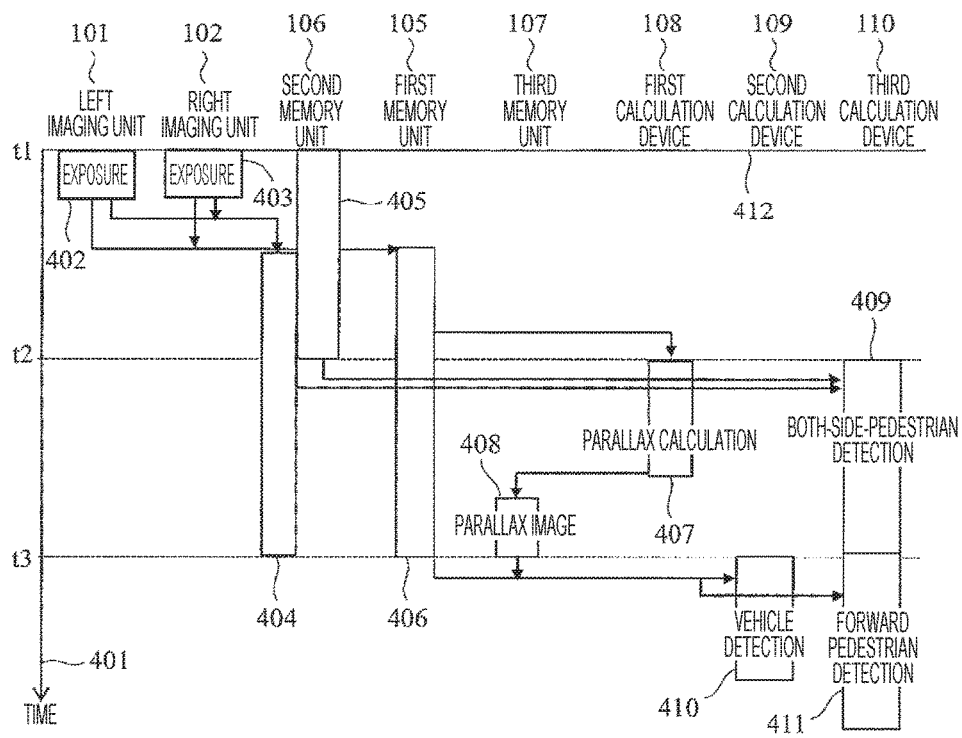

EXTERNAL-ENVIRONMENT-RECOGNIZING APPARATUS

TECHNICAL FIELD

The present invention relates to an external-environment-recognizing apparatus that detects a body from image information on an external environment of a motor vehicle.

BACKGROUND ART

Research and development on apparatuses that automatically control steering, an accelerator, and a brake of a vehicle in order to detect a dangerous event around the vehicle and in order to avoid the detected dangerous event, has been conducted for achievement of safe traveling of vehicles. Some of the vehicles have been already equipped with the apparatuses. A system that detects an obstacle, such as a vehicle or a pedestrian, in the front of a vehicle with a camera with which the vehicle has been equipped, and then alerts to a driver or applies an automatic brake, in the apparatuses is effective in terms of improvement of safety of the vehicle.

In a system that detects an obstacle around a motor vehicle from an image of a camera with which the motor vehicle has been equipped, the number of types of objects to be detected tends to increase. Thus, there is a need to detect a plurality of objects simultaneously. PTL 1 describes a method of performing processing for detecting a plurality of objects on a time series basis with one image sensor shared, in order to meet the need. There is a need to perform detection processing with a limited calculation resource amid a tendency to increase image data to be processed due to an increase of the number of pixels of a camera. PTL 2 describes a method of performing processing by extracting an image region necessary for detecting each object as a method of meeting the need.

CITATION LIST

Patent Literature

PTL 1: WO 2005/006756 A
PTL 2: JP 2012-222762 A

Non-Patent Literature

NPL 1: T. Saito et al, "Development of Software for Driver Assistance System with Stereo Image Recognition", The 14th Symposium on Sensing via Image Information, Digests IN2-14 (2008)
NPL 2: H. Otsuka et al, "Development of Vehicle Detecting Technique Using Edge Pair Feature Spatial Method", VIEW 2005 Vision Engineering Workshop, pp. 160-165, 2005
NPL 3: N. Kiyohara et al, "Development of Mobile Object Detecting Technique for Vehicle Periphery Monitoring", ViEW Vision Engineering Workshop, pp. 59-63 (2011)

SUMMARY OF INVENTION

Technical Problem

Contents described in PTL 1 premise that one calculation device performs processing. A problem that detection processing cannot be performed to all necessary objects in a necessary processing cycle, remains. As described in PTL 2, a method of inhibiting a processing load by limiting an image region to be processed and resolution, cannot perform, detection processing with necessary image resolution in a necessary processing cycle, and cannot acquire a detection result with accuracy necessary for controlling a vehicle in a case where the number of cameras, the number of pixels of each of the cameras, or the number of types of objects increases.

The present invention has been made in consideration of the above problems. An object of the present invention is to provide an external-environment-recognizing apparatus capable of acquiring a detection result with necessary accuracy when a plurality of objects is detected from an imaged image.

Solution to Problem

An external-environment-recognizing apparatus according to the present invention that, solves the above problems, is configured to recognize an external environment with an image including an outside imaged from a vehicle, the external-environment-recognizing apparatus including: a plurality of processing units configured to perform image processing to the image; a recognition-application-storing unit configured to store a plurality of recognition applications that recognizes objects by processing of at least one processing unit of the plurality of processing units, based on classifications of the objects; an external-information-acquiring unit configured to acquire external information including at least one of pieces of external environmental information and own vehicle behavior information; and a selecting unit configured to select at least one recognition application from the recognition-application-storing unit based on the external information, the selecting unit configured to select a processing unit for processing the selected recognition application, from the plurality of processing units.

Advantageous Effects of Invention

According to the present invention, when a plurality of objects is detected from an imaged image, an external-environment-recognizing apparatus that acquires a detection result having necessary accuracy with a limited configuration, can be provided. Note that, problems, configurations, and effects other than the above descriptions will be clear in the following embodiments.

BRIEF DESCRIPTION OF DRAWINGS

FIG. 2 is a flow chart of a processing flow of an image-region-extracting unit.
FIG. 3 is a view of a method of extracting an image in a case where a vehicle is at a low speed.
FIG. 4 is a sequential diagram of a processing schedule in a case where the vehicle is at a low speed.

DESCRIPTION OF EMBODIMENTS

Next, embodiments of the present invention will be described below using the drawings.

First Embodiment

In the present embodiment, a case where an external-environment-recognizing apparatus according to the present invention is applied to a system capable of performing vehicle detection, pedestrian detection, and road sign recognition in the front of an own vehicle, as recognition applications, simultaneously, using an image of a stereo camera with which the vehicle has been equipped, will be described.

First, an outline of the external-environment-recognizing apparatus according to the present embodiment will be described using FIG. 1.

Figure 1:
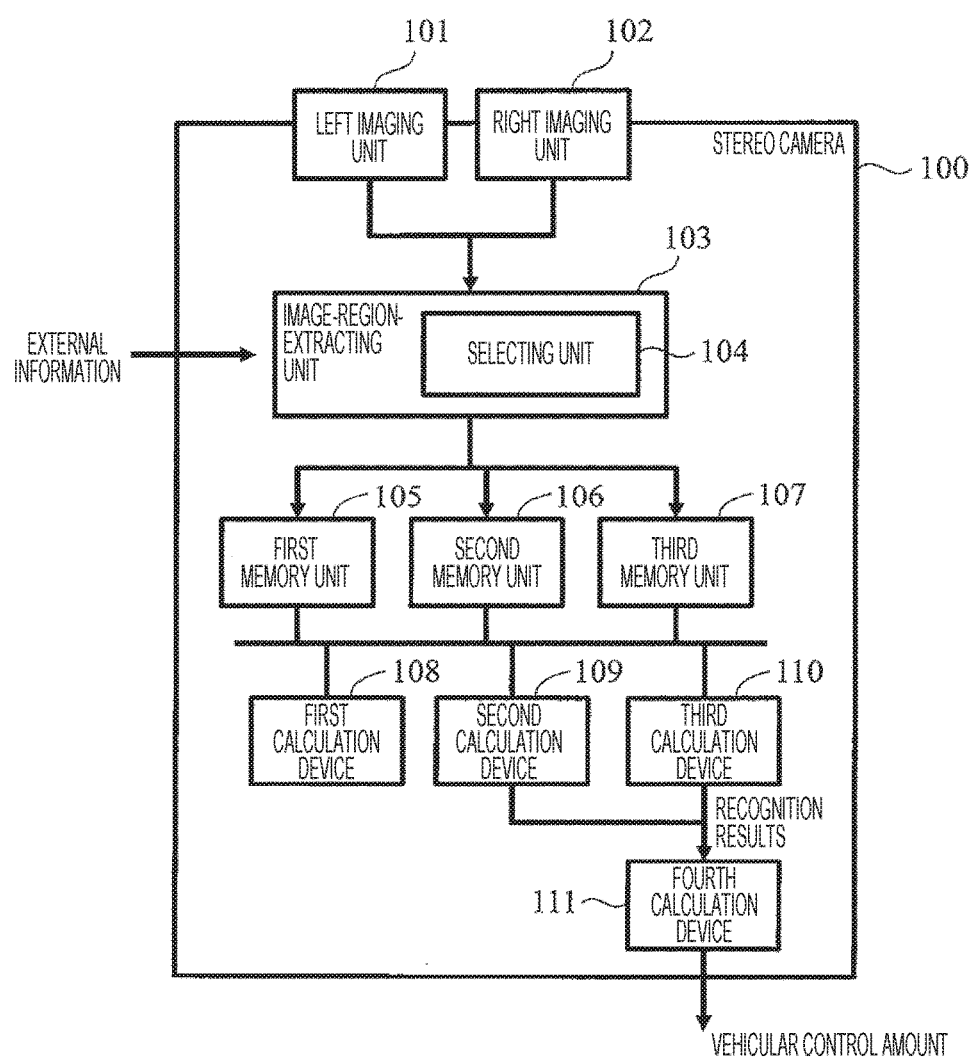
FIG. 1 is a diagram for describing an exemplary configuration of an external-environment-recognizing apparatus according to a first embodiment.

FIG. 1 is a block diagram of achieving the apparatus according to the present invention. A stereo camera 100 images the front of the vehicle from the vehicle equipped with the stereo camera 100, and has a lateral pair of a left imaging unit 101 and a right imaging unit 102 that images a range overlapping partially. The stereo camera 100 is configured in cooperation with hardware, such as a microcomputer having a calculation device and a memory unit, such as a ROM or a RAM, and a software program to be processed by the hardware. The stereo camera 100 has an image-region-extracting unit 103, a plurality of memory units 105, 106, and 107, and a plurality of calculation devices (processing units) 108 to 111, as its internal functions.

The stereo camera 100 has a recognition-application-storing unit (not illustrated) and an external-information-acquiring unit (not illustrated). The recognition-application-storing unit stores a plurality of recognition applications that recognizes objects by processing of at least one calculation device of the plurality of calculation devices 108 to 111, based on classifications of the objects. The external-information-acquiring unit acquires external information including at least one of pieces of external environmental information and own vehicle behavior information. The external information includes the own vehicle behavior information that indicates own vehicle behavior, such as the speed of the own vehicle, the existence or nonexistence of lighting of lamps, the existence or nonexistence of wiper operation, and the external environmental information that indicates external environments, such as a road classification and the degree of urbanization around the road (the inside of a city or an interurban area) acquired from geographic information of a car navigation system.

The image-region-extracting unit 103 extracts regions of parts of images imaged by the left imaging unit 101 and the right imaging unit 102, and then transfers image data included in the regions to at least one of the plurality of memory units 105, 106, and 107. The image-region-extracting unit 103 determines which regions of the images imaged by the left and right imaging units 101 and 102 are extracted and which memory unit and calculation device are used to process the images, using the external information. The image-region-extracting unit 103 includes a selecting unit 104 having a memory unit/calculation device selecting function. The selecting unit 104 selects at least one recognition application from the recognition-application-storing unit based on the external information, and then selects a processing unit for processing the selected recognition application, from the plurality of processing units. At least one memory unit for storing the image data is selected from the plurality of memory units in accordance with the selected recognition application. The image data in the image regions extracted by the image-region-extracting unit 103 is transferred to and stored in at least one of the first memory unit 105, the second memory unit 106, and the third memory unit 107 included in the plurality of memory units.

Processing is performed to the image data transferred to the first memory unit 105, the second memory unit 106, or the third memory unit 107, by the first calculation device 108, the second calculation device 109, or the third calculation device 110. The first calculation device 108 is a dedicated calculation device made as hardware for calculating image distortion correction and parallax calculation processing of the left and right camera images at a high speed. A result processed by the first calculation device 108 is transferred to the second memory unit 106 and the third memory unit 107. Then, recognition processing is further performed to the transferred result by the second calculation device 109 and the third calculation device 110. A vehicle, a pedestrian, and a road sign in the front, being predetermined objects to be recognized, can be recognized. Simultaneously, the second calculation device 109 and the third calculation device 110 also directly perform processing to the image data so as to be able to perform processing for recognizing the vehicle, the pedestrian, and the road sign in the front being the predetermined objects to be recognized, without using the result of the parallax calculation calculated by the first calculation device 108.

Results recognized by the second calculation device 109 and the third calculation device 110 are transferred to the fourth calculation device 111. The fourth calculation device 111 calculates the amount of acceleration/deacceleration and the amount of steering for automatically controlling the own vehicle so as to issue a control instruction to a control device of the own vehicle, using information, such as the existence or nonexistence of the objects to be recognized, relative distances with respect to the objects to be recognized, and relative acceleration included in the recognition results of the vehicle, the pedestrian, and the road sign in the front. The fourth calculation device 111 also determines details for alerting a driver of the own vehicle, transfers the determined alert details to a meter device of the own vehicle, and alerts the driver with, for example, an alarm display on the meter or a voice, using the information, such as the existence or nonexistence of the objects to be recognized, the relative distances with respect to the objects to be recognized, and the relative acceleration included in the recognition results of the vehicle, the pedestrian, and the road sign in the front. According to the present embodiment, all the units 101 to 111 described in FIG. 1 are implemented on the stereo camera 100.

Here, the calculation device 108 is the dedicated calculation device (an ASIC or an FPGA), the calculation device 109 is one general purpose calculation device, and the calculation device 110 is another general purpose calculation device in the calculation devices 108, 109, and 110. Totally, three processing devices are mounted. As another exemplary configuration, the calculation device 108 is a dedicated calculation device (an ASIC or a FPGA), the calculation device 109 is one calculation core in one general purpose calculation device, and the calculation device 110 is another calculation core in the one general purpose calculation. A configuration including totally two processing devices mounted therein may be provided. Furthermore, as another exemplary configuration, a configuration in which the entirety has a one-chip calculation device and the one calculation device includes the calculation device 108 (an ASIC or a FPGA), the calculation device 109 (one calculation core), and the calculation device 110 (another calculation core) implemented therein, may be provided.

Next, the processing to be performed by the image-region-extracting unit 103 of the stereo camera 100 will be described below using FIG. 2.

FIG. 2 is a flow chart of a processing flow to be performed by the image-region-extracting unit 103. First, during external information reading processing 201, the external information including the own vehicle behavior information, such as the speed of the own vehicle, and the external environmental information, such as a road classification and the degree of urbanization around the road (the inside of a city or an interurban area) acquired from the geographic information of the car navigation system, is acquired from the exterior of the stereo camera 100 (the external-information-acquiring unit). During schedule reading processing 202, a schedule including the memory unit/calculation device selecting function is read, based on the external information acquired by the external information reading processing 201. Here, the schedule is a time-series schedule relating to the recognition application to be performed and timing to be performed, exposure time and exposure timing of the left imaging unit 101 and the right imaging unit 102, the extraction of the image regions from the left and right images acquired by the left imaging unit 101 and the right imaging unit 102, and a method of transferring the extracted image regions to the memory units 105, 106, and 107. This schedule is previously stored in a memory device, such as a ROM, of the stereo camera 100. The details of the schedule reading processing 202 will be described later.

Next, during exposure time/timing transmission processing 203, the exposure time and the exposure timing of the left imaging unit 101 and the right imaging unit 102 read by the schedule reading processing 202 are transmitted to a controller that controls imaging of the left imaging unit 101 and the right imaging unit 102. During left image reading processing 204, image data of the left image imaged by the left imaging unit 101 is read based on the information transmitted by the exposure time/timing transmission processing 203. Then, during left image transmission processing 205, the image data of the left image read by the left image reading processing 204 is transferred to a predetermined memory unit in the memory units 105, 106, and 107, based on the memory unit/calculation device selecting schedule read by the schedule reading processing 202. Next, during right image reading processing 206, image data of the right image imaged by the right imaging unit 102 is read based on the information transmitted by the exposure time/timing transmission processing 203. Then, during right image transmission processing 207, the image data of the right image read by the right image reading processing 206 is transferred to a predetermined memory unit in the memory units 105, 106, and 107, based on the memory unit/calculation device selecting schedule read by the schedule reading processing 202.

For example, in a case where the external information read by the external information reading processing 201 in FIG. 2 includes that the speed of the own vehicle is low, the road classification acquired from the geographic information of the car navigation system is a narrow street, and the degree of urbanization around the road is the inside of a city (an urban area) (hereinafter, referred to as Case 1), a pedestrian is expected to run out into the front of the vehicle. Therefore, priority of the pedestrian detection is the highest in the vehicle detection, the pedestrian detection, and the road sign recognition in the front. Priority of detection of a pedestrian who runs out from the left or the right is the highest in the pedestrian detection. The processing of the vehicle detection in the front has second priority. Note that, since having low priority, the road sign recognition is not performed in a case where the above external information is provided. The method of transferring the extracted images to the memory units 105, 106, or 107 is determined based on these types of priority.

For example, when the external information read by the external information reading processing 201 in FIG. 2 is in a case where the speed of the own vehicle is high, and the road classification acquired from the geographic information of the car navigation system, is a superhighway (hereinafter, referred to as Case 2), the processing of the vehicle detection in the front for performing a forward vehicle follow-up function (ACC: Adaptive Cruse Control) and a warning about excessive speed are important applications, and a possibility that a pedestrian is present on the superhighway is low. Therefore, the priority of the vehicle detection is the highest in the vehicle detection, the pedestrian detection, and the road sign recognition. The processing of the sign recognition has second priority. The pedestrian detection is not performed because its priority is low. The method of transferring the extracted images to the memory units 105, 106, or 107 is determined based on these types of priority.

Next, the schedule to be read by the schedule reading processing 202 will be described.

First, extraction of the left and right images will be described using FIG. 3. In FIG. 3, reference numeral 301 denotes the left image imaged by the left imaging unit 101. Reference numeral 302 denotes the right image imaged by the right imaging unit 102. The left imaging unit 101 and the right imaging unit 102 are provided so as to have a certain distance therebetween (base length). Thus, the stereo camera 100 includes an overlapped region 305 in which the left imaging unit 101 and the right imaging unit 102 image the same object, a region 306 imaged only by the left imaging unit 101, and a region 307 imaged only by the right imaging unit 102.

In this case, images to be extracted from the left image 301 and to be used are included in a left image overlap extracting region being an image extracting region 303 of a part of the overlapped region 305 of the left and right images, and a left image single extracting region (a left image single region) being an image extracting region 304 of the region 306 imaged only by the left imaging unit 101. Images to be extracted from the right image 302 and to be used are included in a right image overlap extracting region being the image extracting region 303 of the overlapped region 305 of the left and right images, and a right image single extracting region (a right image single region) being an image extracting region 310 of the region 307 imaged by only the right imaging unit 102.

The image extracting regions 303 of the left image 301 and the right image 302 have image coordinates 308 at the upper left of the extracting region defined as (uS1, vS1), image coordinates 309 at the lower right of the extracting region defined as (uE1, vE1), and the image thinning rate defined as D1. Here, in a case where the thinning rate D1 is 1, all pixels in the image extracting region 1. For example, in a case where the thinning rate is ½, each of the images is captured every pixel lengthwise and breadthwise. In a case where the thinning rate is ⅓, each of the images is captured every two pixels lengthwise and breadthwise.

The left image overlap extracting region and the right image overlap extracting region being the image extracting regions 303 of the left image 301 and the right image 302, respectively, are used as images for detecting a vehicle in the front during recognition processing at a subsequent stage. Similarly, images are captured from the left image single extracting region being the image extracting region 304 of the left image 301 and the right image single extracting region being the image extracting region 310 of the right image 302 in accordance with image coordinates at the upper left of the extracting region, image coordinates at the lower right of the extracting region, and the image thinning rate. The images in the left image single extracting region and the right image single extracting region are used as images for detecting a pedestrian who runs out from the left or the right in the front of the own vehicle during recognition processing at the subsequent stage.

Next, a time-series schedule relating to the exposure time and the exposure timing of the left imaging unit 101 and the right imaging unit 102, and the method of transferring the extracted images to the memory units 105, 106, and 107, will be described using FIG. 4.

FIG. 4 is a sequential diagram of the schedule in a case where the external information read by the external information reading processing 201 includes that the speed of the own vehicle is low, the road classification acquired from the geographic information of the car navigation system, is a narrow street, and the degree of urbanization around the road is the inside of a city (an urban area) (Case 1).

In FIG. 4, a vertical axis 401 indicates time, and a horizontal axis 412 indicates each of the devices in the stereo camera 100 (the left imaging unit 101, the right imaging unit 102, the second memory unit 106, the first memory unit 105, the third memory unit 107, the first calculation device 108, the second calculation device 109, and the third calculation device 110). Operation in response to time 401 is described below the horizontal axis 412. Here, the first calculation device 108 is the dedicated calculation device made as hardware for calculating the image distortion correction and the parallax calculation processing of the left and right camera images at a high speed. The third calculation device 110 is the general-purpose calculation device capable of performing software processing at a high speed. The second calculation device 109 is the general purpose calculation device having a processing speed lower than that of the third calculation device 110.

First, exposures 402 and 403 are performed with the exposure time and timing (t1) transmitted to the left imaging unit 101 and the right imaging unit 102 during the exposure time/timing reading processing 203 in the processing flow of the image-region-extracting unit 103 in FIG. 2. Only the image extracting regions 303 in FIG. 3 are extracted from the image data of the left image imaged by the left imaging unit 101 with the exposure 402 and the image data of the right image imaged by the right imaging unit 102 with the exposure 403, so as to be transmitted to the first memory unit 105.

The first memory unit 105 is a memory attached to the first calculation device 108. The first calculation device 108 performs parallax calculation 407 to the image data 406 of the image extracting regions 303 transmitted to the first memory unit 105, with timing of time t2. A parallax image 408 being output of the calculation result is transmitted to the third memory unit 107. A method of the parallax calculation will be described later. The third memory unit 107 is a memory attached to the second calculation device 109 and the third calculation device 110. The parallax image 408 retained in the third memory unit 107 is transmitted to the second calculation device 109. The second calculation device 109 performs the vehicle detection processing for detecting a vehicle in the front of the own vehicle, with timing of time t3.

Parallax is equivalent to information on a distance from the own vehicle (the stereo camera 100). In order to detect the vehicle in the front of the own vehicle, as representative values, a distance positioned closest to the own vehicle is extracted one by one every section into which the parallax image is vertically divided. Pieces of distance data present close to each other in the representative values are grouped. A group having a predetermined size or more is defined as a solid object. Separately, a traveling plane on which the own vehicle travels is estimated, and then a solid object present in an upper portion of the traveling plane is detected. Processing of extracting the solid object is described in NPL 1, T. Saito et al, "Development of Software for Driver Assistance System with Stereo Image Recognition", The 14th Symposium on Sensing via Image Information, Digests IN2-14 (2008). It is determined whether the detected solid object is a vehicle, based on the size and the shape of the detected solid object.

The determination of the vehicle is also made based on image shading pattern information, using the image data 406 retained in the first memory unit 105. Thus, the first memory unit 105 also transmits the image data 406 to the second calculation device 109. In order to make the determination of the vehicle based on the image shading pattern information, a method described in NPL 2, H. Otsuka et al, "Development of Vehicle Detecting Technique Using Edge Pair Feature Spatial Method", VIEW 2005 Vision Engineering Workshop, pp. 160-165, 2005, is used.

Meanwhile, only the image extracting region 304 of the left image 301 in FIG. 3 is extracted from the image data imaged by the left imaging unit 101 with the exposure 402, so as to be transmitted to the second memory unit 106. Only the image extracting region 310 of the right image 302 in FIG. 3 is extracted from the image data imaged by the right imaging unit 102 with the exposure 403, so as to be transmitted to the second memory unit 106. The second memory unit 106 is a memory attached to the third calculation device 110. The second memory unit 106 transmits the image data 44, in the image extracting region 304 of the left image 301 and the image extracting region 310 of the right image 302, retained in the second memory unit 106 with timing of time t1, and image data 405 of the image data, in the image extracting region 304 of the left image 301 and the image extracting region 310 of the right image 302, imaged with timing of one cycle before time t1 and retained in the second memory unit 106, to the third calculation device 110.

The third calculation device 110 calculates a difference between the pieces of time-series image data 405 and 404 that have been received. With timing of time t2, the third calculation device 110 performs processing for detecting a body moving in a direction of the image center (a pedestrian who runs out from the left or the right in the front of the own vehicle) in the left image single extracting region 304 and the right image single extracting region 310. First, optical flow of continuous images on a time series basis is calculated in order to detect a region in which the body moves, from the time-series images. The optical flow is an already-established-known technique. Two frame images are compared, and the same body included in the two images is identified so that the optical flow can be calculated.

Since the own vehicle moves, a background also moves other than a moving body. Thus, there is a need to extract a region indicating a movement different from the movement of the background in accordance with the movement of the vehicle, from a region in which a variation on the images has occurred and the body has moved. In order to detect the movement of the background in accordance with the movement of the vehicle, the movement of the background is estimated by using vehicle information, such as the speed of the vehicle and yaw rate, and geometric conditions, such as internal parameters (the unit cell size of an image sensor, a focal length, and a distortion parameter) and external parameters (an angle of depression, a turning angle, the installation height of the camera) of the camera.

The estimation of the movement of the background is described in NPL 3, N. Kiyohara et al, "Development of Mobile Object Detecting Technique for Vehicle Periphery Monitoring", ViEW Vision Engineering Workshop, pp. 59-63 (2011). The movement of the background is canceled in the region in which the variation on the images has occurred and the body has moved. The region indicating the movement different from the movement of the background in accordance with the movement of the vehicle is extracted. A region having a size in a certain range in the region is defined as a pedestrian who runs out from the left or the right in the front of the own vehicle. Accordingly, pedestrians who are positioned on both of the left and right sides with respect to the front of the own vehicle, can be detected.

The third calculation device 110 performs processing for detecting a pedestrian in the front of the own vehicle with timing of time t3, using the parallax image 408 retained in the third memory unit 107 and the image data 406 retained in the first memory unit 105. A method the same as that of the above vehicle detection 410, can be used in order to detect the pedestrian. It is determined whether a detected solid object is a pedestrian, based on the size and the shape of the detected solid object. Therefore, a pedestrian on a path in the front of the own vehicle, can be detected.

Next, a schedule in a case where the speed of the own vehicle is high, and the road classification acquired from the geographic information of the car navigation system is a superhighway (Case 2), will be described. First, extraction of the left and right images in Case 2 will be described using FIG. 5.

Figure 5:
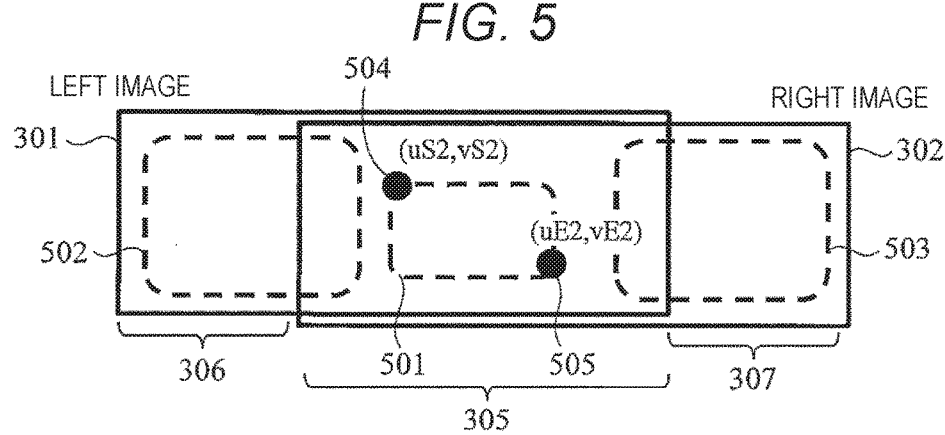
FIG. 5 is a view of a method of extracting an image in a case where the vehicle is at a high speed.

In FIG. 5, constituent elements the same as those in FIG. 3 are denoted with the same reference signs, and the detailed descriptions thereof will be omitted. In this case, images to be extracted from the left image 301 and to be used are included in a left image overlap extracting region being an image region 501 of a part of the overlapped region 305 of the left and right images, and a left image partially overlap region being an image region 502 ranging from the region 306 imaged only by the left imaging unit 101, to the region 305 imaged with an overlap with the right image 302. Images to be extracted from the right image 302 and to be used are included in a right image overlap extracting region being an image region 503 of a part of the overlapped region 305 of the left and right images, and a right image partially overlap region being an image region 503 ranging from a region 307 imaged only by the right imaging unit 102, to the region 305 imaged with an overlap with the left image 301.

The image extracting regions 501 of the left image 301 and the right image 302 have image coordinates 504 at the upper left of the extracting region defined as (uS2, vS2), image coordinates 505 at the lower right of the extracting region defined as (uE2, vE2), and the image thinning rate defined as D2. Here, in a case where the thinning rate D2 is 1, all pixels in the image extracting region 1. For example, in a case where the thinning rate is ½, each of the images is captured every pixel lengthwise and breadthwise. In a case where the thinning rate is ⅓, each of the images is captured every two pixels lengthwise and breadthwise. The left image overlap extracting region and the right image overlap extracting region being the image extracting regions 501 of the left image 301 and the right image 302, respectively, are used as images for detecting a distant vehicle in the front during recognition processing at a subsequent stage.

Similarly, images are captured from the left image partially overlap region being the image extracting region 502 of the left image 301 and the right image partially overlap region being the image extracting region 503 of the right image 302 in accordance with image coordinates at the upper left of the extracting region, image coordinates at the lower right of the extracting region, and the image thinning rate. The images in the left image partially overlap region and the right image partially overlap region are used as images for recognizing a road sign in the front of the own vehicle.

Next, a time-series schedule relating to the exposure time and the exposure timing of the left imaging unit 101 and the right imaging unit 102, and the method of transferring the extracted images to the memory units 105, 106, and 107, will be described using FIG. 6.

Figure 6:
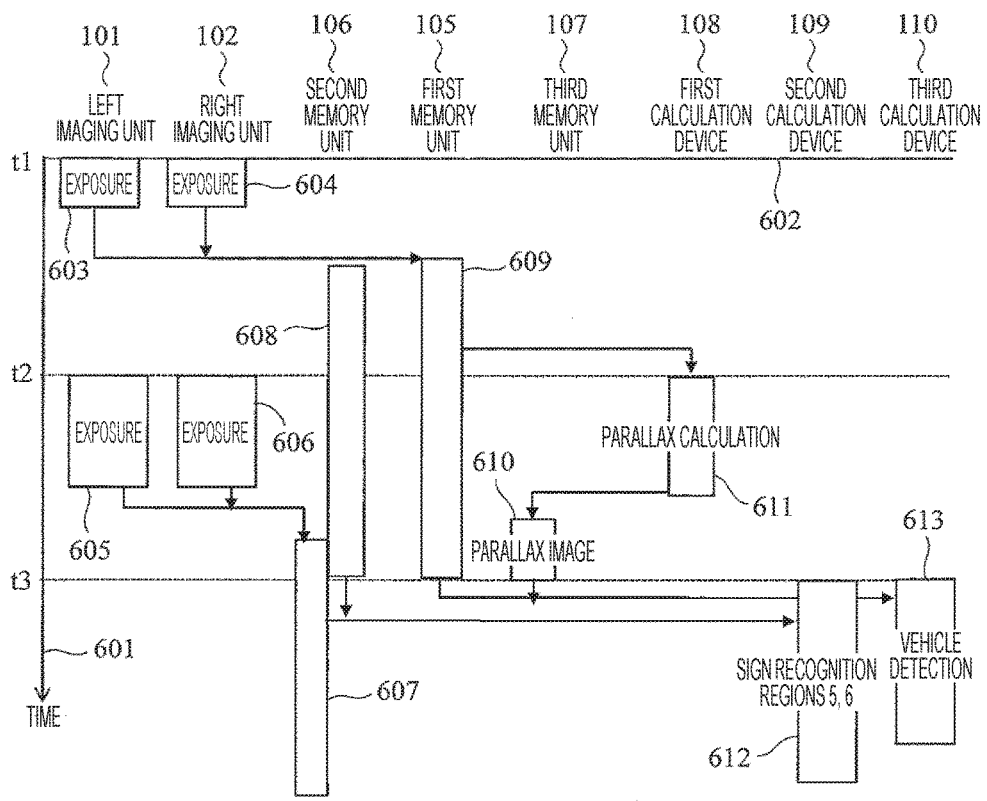
FIG. 6 is a sequential diagram of a processing schedule in a case where the vehicle is at a high speed.

FIG. 6 is a sequential diagram of the schedule of Case 2, namely, the schedule in a case where the speed of the own vehicle is high, and the road classification acquired from the geographic information of the car navigation system is a superhighway.

In FIG. 6, a vertical axis 601 indicates time, and a horizontal axis 602 indicates each of the devices in the stereo camera 100 (the left imaging unit 101, the right imaging unit 102, the second memory unit 106, the first memory unit 105, the third memory unit 107, the first calculation device 108, the second calculation device 109, and the third calculation device 110). Operation in response to time 601 is described below the horizontal axis 602. Here, the first calculation device 108 is the dedicated calculation device made as hardware for calculating the image distortion correction and the parallax calculation processing of the left and right camera images at a high speed. The third calculation device 110 is the general purpose calculation device capable of performing software processing at a high speed. The second calculation device 109 is the general purpose calculation device having a processing speed lower than that of the third calculation device 110.

First, exposures 603 and 604 are performed with the exposure time and timing (t1) transmitted to the left imaging unit 101 and the right imaging unit 102 during the exposure time/timing reading processing 203 in the processing flow of the image-region-extracting unit 103 in FIG. 2. Only the image extracting regions 501 in FIG. 5 are extracted from the image data imaged by the left imaging unit 101 with the exposure 603 and the image data imaged by the right imaging unit 102 with the exposure 604, so as to be transmitted to the first memory unit 105.

The first memory unit 105 is the memory attached to the calculation device 1. The first calculation device 108 performs parallax calculation 611 to the image data 609 of the image extracting regions 501 transmitted to the first memory unit 105, with timing of time t2. A parallax image 610 being output of the calculation result is transmitted to the third memory unit 107. A method of the parallax calculation will be described later. The third memory unit 107 is the memory attached to the second calculation device 109. The parallax image 610 retained in the third memory unit 107 is transmitted to the third calculation device 110. The third calculation device 110 performs processing for detecting a vehicle in the front of the own vehicle, with timing of time t3. A method of detecting the vehicle in the front of the own vehicle is the same as that of the above vehicle detection processing 410 in FIG. 4.

Next, exposures 605 and 606 are performed with the exposure time and timing (t2) transmitted to the left imaging unit 101 and the right imaging unit 102 during the exposure time/timing reading processing 203 in the processing flow of the image-region-extracting unit 103 in FIG. 2. The exposures 603 and 604 are necessary for images for detecting the vehicle in the front. The exposures 605 and 606 are necessary for images for recognizing a road sign. Therefore, exposure time of the exposures 605 and 606 is set so as to be longer than exposure time of the exposures 603 and 604.

Only an image region being the image extracting region 502 in FIG. 5 is extracted from the image imaged by the left imaging unit 101 with the exposure 605. The image data is transmitted to the second memory unit 106. Then, only an image region being the image extracting region 503 in FIG. 5 is extracted from the image imaged by the right imaging unit 102 with the exposure 606. The image data is transmitted to the second memory unit 106.

The second memory unit 106 is the memory attached to the second calculation device 109. The left and right image data 607 retained in the second memory unit 106 and image data 608 imaged with timing of one cycle before time t2 and retained in the second memory unit 106, in regions of the image extracting region 502 and the image extracting region 503, are transmitted to the second calculation device 109.

The second calculation device 109 performs processing for recognizing a sign in the image regions with timing of time t3, using the received image data 607. In order to recognize the sign, a circular edge is first detected from the images and then is made as a representative of a region in which the sign is present. Other class recognition processing is performed, using a result of machine learning with respect to the representative. Letters or numbers in the representative region are recognized. Using information including the speed of the own vehicle and yaw rate, it is estimated where an image pattern the same as that of the sign recognized with the image data 607 has been positioned in the image data 608 imaged the one cycle before. The degree of similarity between the image pattern at the estimated position and an image pattern of the sign recognized with the image data 607 is calculated. Then, in a case where the degree of similarity is high, the sign recognized with the image data 607 is determined as a recognition result.

Here, processing priority of each application (vehicle detection, pedestrian detection, sign detection, and lane recognition) in the schedules in FIGS. 4 and 6, will be described. In FIG. 4, the external information read by the external information reading processing 201 in FIG. 2 includes that the speed of the own vehicle is low, the road classification acquired from the geographic information of the car navigation system is a narrow street, and the degree of urbanization around the road is the inside of a city (an urban area). Thus, the pedestrian detection, the vehicle detection, the sign detection, and the lane recognition are arranged in descending order of the processing priority. In FIG. 4, the schedule of the processing of the pedestrian detection and the vehicle detection out of the applications is illustrated. The remaining sing detection and lane recognition are performed during unoccupied time of the processing of the second calculation device 109 and the third calculation device 110.

In FIG. 6, the external information read by the external-information reading processing 201 in FIG. 2 includes that the speed of the own vehicle is high and the road classification acquired from the geographic information of the car navigation system is a superhighway. Thus, the vehicle detection, the sign detection, the lane recognition, and the pedestrian detection are arranged in descending order of the processing priority. In FIG. 6, the schedule of the processing of the vehicle detection and the sign detection out of the applications is illustrated. The remaining lane recognition and the pedestrian detection are performed during unoccupied time of the processing of the second calculation device 109 and the third calculation device 110.

Parallax Calculation Method

A method of the parallax calculation processing to be performed at 407 in FIG. 4 and at 611 in FIG. 6, will be described using a flow chart in FIG. 7.

Figure 7:
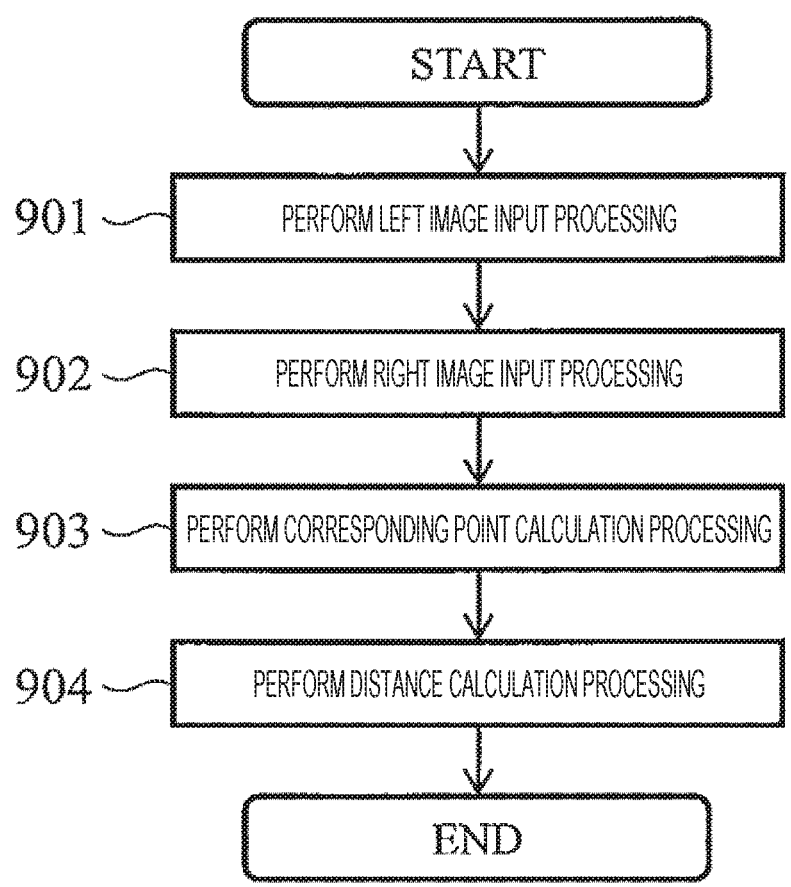
FIG. 7 is a flow chart of a processing flow of parallax calculation.

In the flow chart in FIG. 7, the image data imaged by the left imaging unit 101 is first received during left image input process 901. Next, the image data imaged by the right imaging unit 102 is received during right image input processing 902. Here, the left image input processing 901 and the right image input processing 902 may be simultaneously performed as parallel processing.

Figure 8:
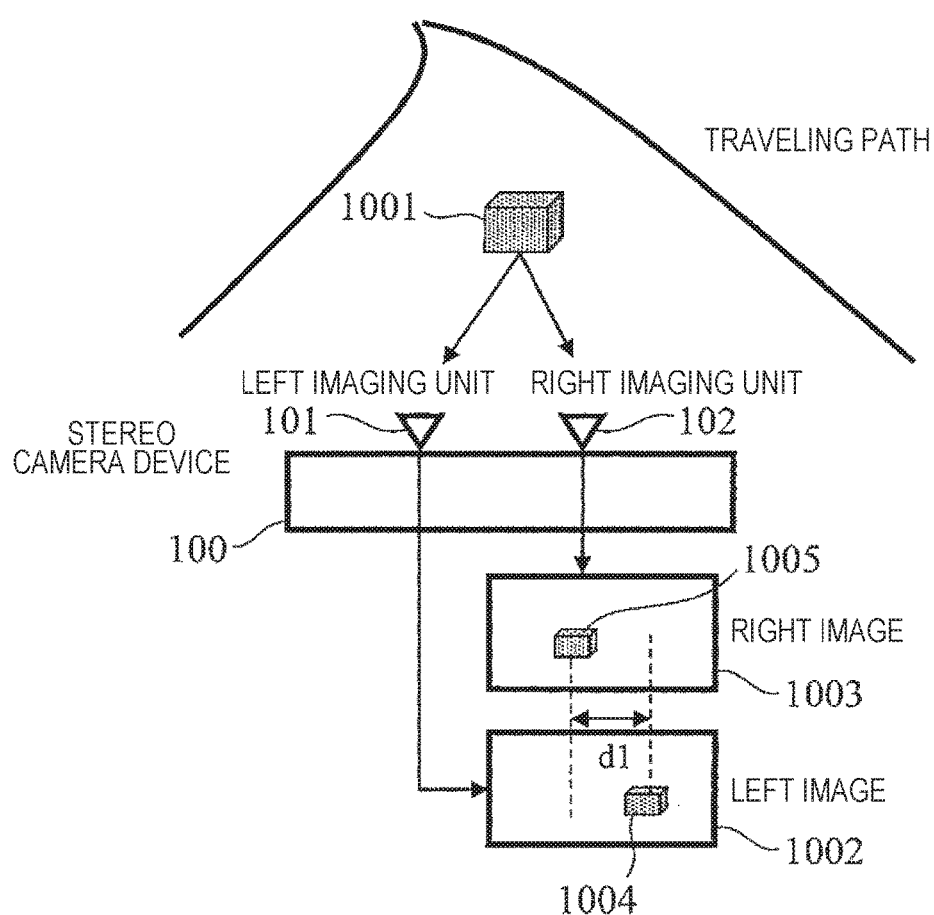
FIG. 8 is a view for describing a corresponding point between left and right images in a stereo camera.

Next, left and right two images acquired by the left image input processing 901 and the right image input processing 902 are compared with each other and then regions in which the same body has been imaged, is specified during corresponding point calculation processing 903. That is, as illustrated in FIG. 8, when the stereo camera 100 images a body 1001 being an object present on a traveling path, images imaged by the left imaging unit 101 and the right imaging unit 102 are made so as to be a left image 1002 and a right image 1003, respectively. Here, the same body 1001 is imaged at a position 1004 in the left image 1002 and the same body 1001 is imaged at a position 1005 in the right image 1003. As a result, a difference d1 occurs in a horizontal direction of the images. Therefore, there is a need to specify where the body imaged at 1004 in the left image 1002 has been imaged in the right image 1003.

Next, a method of specifying where the specific body imaged in the left image 1002 has been imaged in the right image 1003, will be described using FIG. 9.

Figure 9:
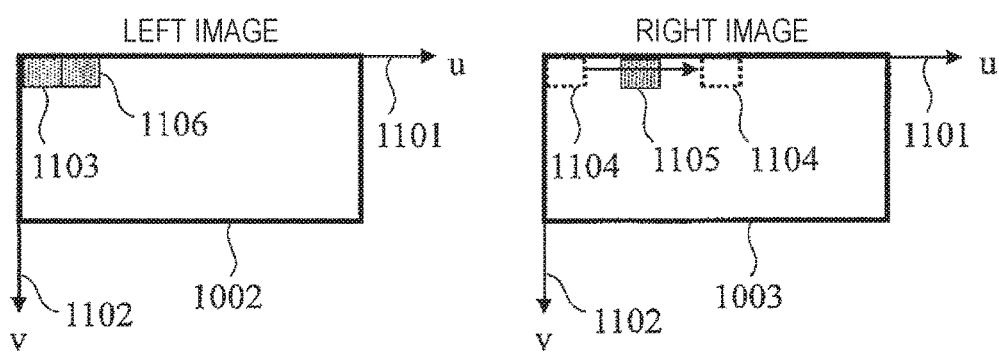
FIG. 9 is a view for describing how to acquire the corresponding point between the left and right images.

In FIG. 9, a horizontal direction is defined as a u axis 1101 and a vertical direction is defined as a v axis 1102 in coordinate systems of the left image and the right image. First, a rectangular region 1103 surrounded with (u1, v1), (u1, v2), (u2, v1), and (u2, v2) is set in a uv coordinate system in the left image 1002.

Next, a region surrounded with (U, v1), (U, v2), (U+(u2−u1), v1), and (U+(u2−u1), v2) in the right image 1003, scans up to a rectangular region 1104 in a right direction of the image with a value of U increased from u=0 to u=u3, Upon the scanning, correlation values of an image in the rectangular-region 1103 and an image in the rectangular region 1104 are compared with each other. Then, a body the same as a body imaged in the rectangular region 1103 is assumed to be imaged at a position (u4, v1), (u4, v2), (u4+(u2−u1), v1), and (u4+(u2−u1), v2) in a rectangular region 1105 of the right image 1003 at which correlativity with the rectangular region 1103 of the left image 1002 is the highest. Here, each pixel in the rectangular region 1103 corresponds to each pixel in the rectangular region 1105, Here, when the rectangular region 1104 of the right image 1003 scans, a corresponding point in the right image 1003 corresponding to the rectangular region 1103 of the left image 1002 is made so as not to be present in a case where there is no rectangle having a correlation value to nave a certain value or more.

Next, the rectangular region of the left image 1002 moves to a position 1106, and then the same processing is performed. In this manner, the rectangular region of the left image 1002 scans over the entire inside of the left image 1002 so that the corresponding point in the right image 1003 is acquired with respect to ail pixels in the left image 1002. In a case where no corresponding point is detected, no corresponding point is made.

Next, distance calculation processing 904 is performed in the flow chart in FIG. 7. Here, the parallax and the distance are equivalent to each other. Parallax data is converted into distance data during this processing.

Regarding the corresponding point between the left image 1002 and the right image 1003 including the same body imaged, acquired by the above corresponding point calculation processing 903, in what distance each corresponding point is positioned from the stereo camera 100 is calculated during the distance calculation processing 904.

A method of calculating a distance of a corresponding point 1201 between the left image 1002 and the right image 1003 from the camera, will be described using FIG. 10.

Figure 10:
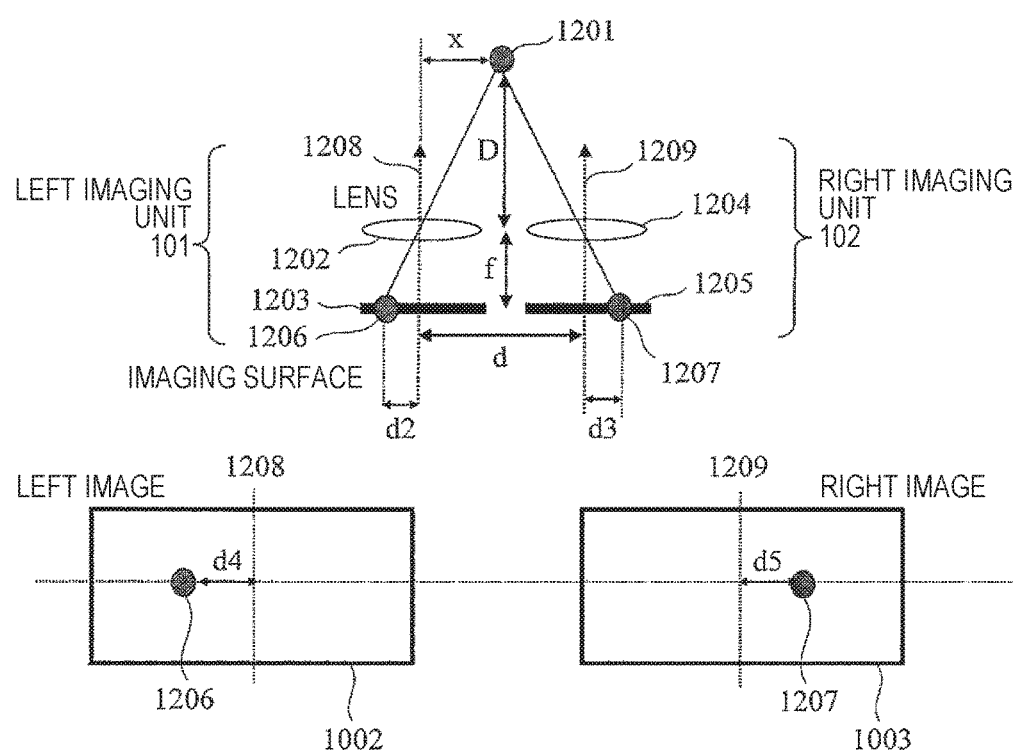
FIG. 10 is a view for describing how to calculate a distance from parallax in the stereo camera.

In FIG. 10, the left imaging unit 101 is a camera including a lens 1202 and an imaging surface 1203 with a focal length f and an optical axis 1208. The right imaging unit 102 is a camera including a lens 1204 and an imaging surface 1205 with the focal length f and an optical axis 1209. The point 1201 in the front of the camera is imaged at a point 1206 on the imaging surface 1203 of the left imaging unit 101 (a distance of d2 from the optical axis 1208). The point 1201 is imaged at the point 1206 on the left image 1002 (a position of pixels in an amount of d4 from the optical axis 1208). Similarly, the point 1201 in the front of the camera is imaged at a point 1207 on the imaging surface 1205 of the right imaging unit 102 (a distance of d3 from the optical axis 1209). The point 1201 is imaged at the point 1207 on the right image 1003 (a position of pixels in an amount of d5 from the optical axis 1209).

In this manner, the point 1201 of the same body is imaged at the position of the pixels in an amount of d4 from the optical axis 1208 in a left direction on the left image 1002 and at the position of d5 from the optical axis 1209 in a right direction on the right image 1003. Thus, a parallax having pixels in an amount of d4+d5 occurs. Accordingly, when a distance between the optical axis 1208 of the left imaging unit 101 and the point 1201 is defined as x, a distance D between the stereo camera 100 and the point 1201 can be acquired by the following expressions.

Relationship between the point 1201 and the left imaging unit 101 results in the following expression: $d2:f=x:D$ Relationship between the point 1201 and the right imaging unit 102 results in the following expression: $d3:f=(d-x):D$ Therefore, the following expression is acquired: $D=f\times d/(d2+d3)=f\times d/\{(d4+d5)\times a\}$ where a represents the size of image sensors of the imaging surfaces 1203 and 1205.

The distance calculation that has been described above is performed to all corresponding points calculated by the above corresponding point calculation processing 903. As a result, a distance image representing the distance between the stereo camera 100 and the object can be acquired, and the distance image and the parallax image can be handled so as to be equivalent to each other.

According to the present invention, there is provided the selecting function for selecting a processing unit and a memory unit to be used from the plurality of processing units and memory units, in consideration of image resolution, an image region, and a processing cycle necessary for the recognition applications for detecting an object. The selecting function has information on the pieces of timing with which the calculation devices and the memory devices are used, based on the external information including the external environmental information, such as the road classification of a road on which the own vehicle travels, and the own vehicle behavior information, such as the speed of the own vehicle.

According to the present invention, necessary recognition applications are selected based on the external information, and then a calculation device and a memory unit for performing the recognition applications are selected. Thus, the limited memory device and calculation device can perform processing to the plurality of necessary recognition applications with necessary accuracy (the processing cycle, the image region, and the image resolution).

Other Exemplary Configurations

Figure 11:
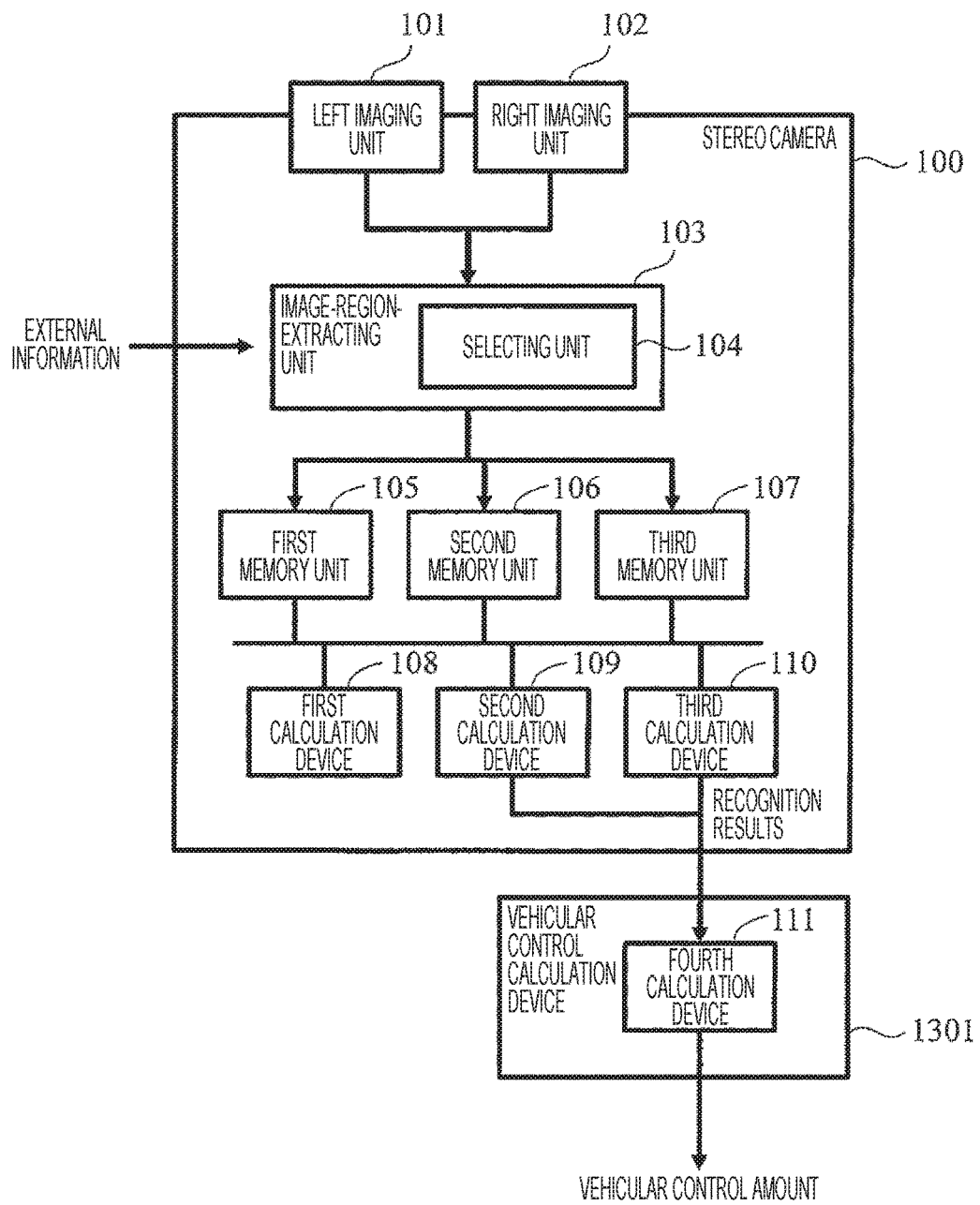
FIG. 11 is a diagram for describing another exemplary configuration of the external-environment-recognizing apparatus according to the first embodiment.
Figure 12:
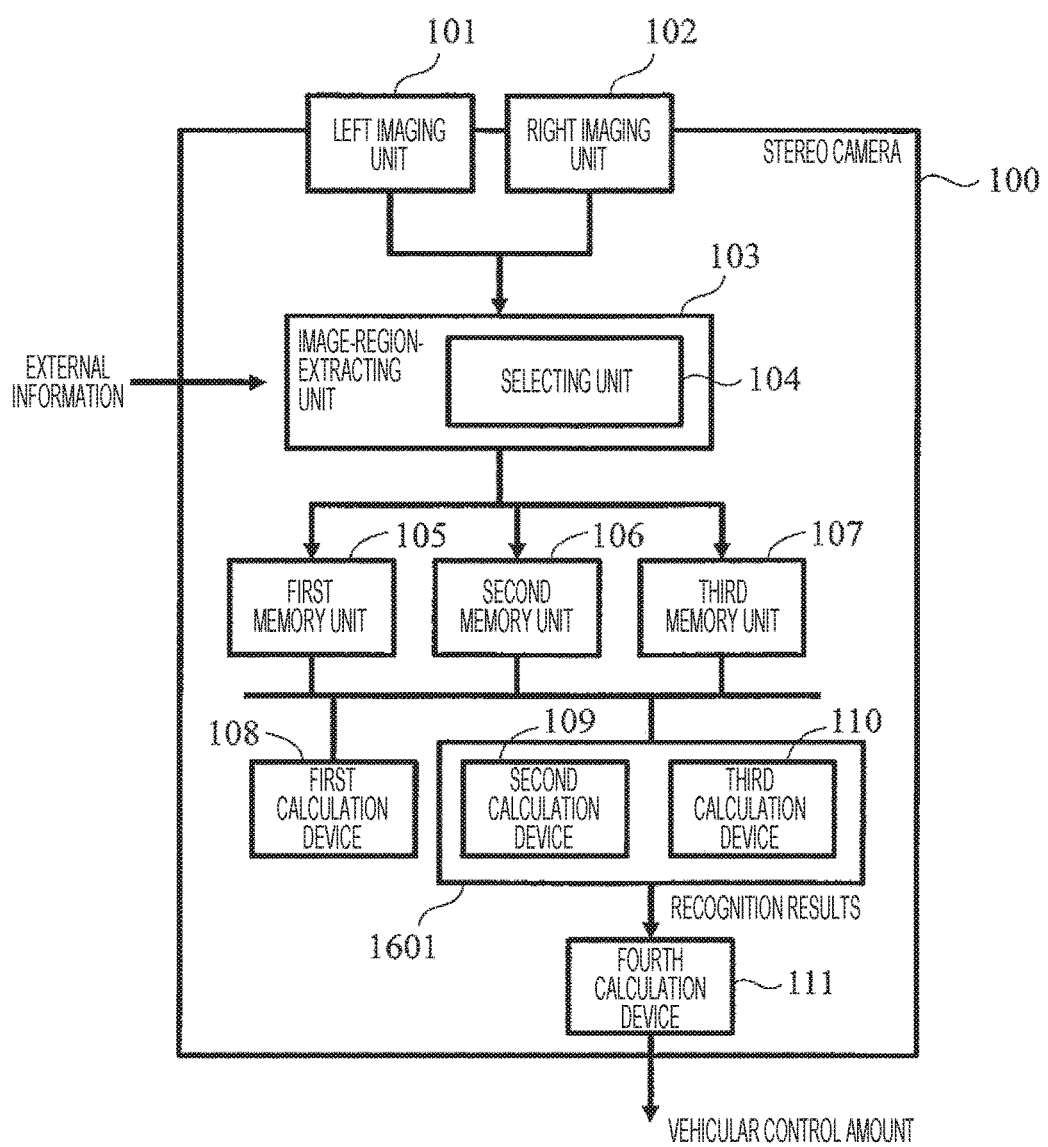
FIG. 12 is a diagram for describing another exemplary configuration of the external-environment-recognizing apparatus according to the first embodiment.

FIGS. 11 and 12 are block diagrams for describing other exemplary configurations of the first embodiment.

A point different from the exemplary configuration illustrated in FIG. 1 is in that a fourth calculation device 111 is included in a vehicular control calculation device 1301. An external-environment-recognizing apparatus includes a stereo camera 100 and the vehicular control calculation device 1301. An exemplary configuration illustrated in FIG. 12 is different from, the exemplary configuration illustrated in FIG. 1 in that a multicore including a second calculation device 109 and a third calculation device 110 integrated into one chip, is provided. A calculation device 1601 is a multicore CPU having the two calculation cores (the second calculation device 109 and the third calculation device 110). The external-environment-recognizing apparatus according to the present invention is not limited to the configuration illustrated in FIG. 1, and, for example, various alterations can be made as the above configurations illustrated in FIGS. 11 and 12.

Second Embodiment

Next, a second embodiment of the present invention will be described below using FIG. 13.

A characteristic point according to the present embodiment is in that a configuration of detecting a pedestrian on the entire circumference of a vehicle by coupling four-cameras for imaging all directions of the vehicle to a stereo camera, is provided. The camera 1401, the camera 1402, the camera 1403, and the camera 1404 are monocular cameras attached to the vehicle, and are arranged in all directions of the vehicle. Images imaged by a left imaging unit 101 and a right imaging unit 102 of the stereo camera 100 and images imaged by the camera 1401, the camera 1402, the camera 1403, and the camera 1404, are transmitted to an image-region-extracting unit 103.

The image-region-extracting unit 103 extracts partial regions of the images imaged by the left imaging unit 101, the right imaging unit 102, the camera 1401, the camera 1402, the camera 1403, and the camera 1404, and then transmits the partial regions to a first memory unit 105, a second memory unit 106, and a third memory unit 107.

A second calculation device 109 and a third calculation device 110 performs processing for recognizing a vehicle, a pedestrian, a road sign in the front, or a pedestrian on the entire circumference of the vehicle, being predetermined objects to be recognized, with or without a parallax calculation result calculated by a first calculation device 108.

According to the present embodiment, the units 101 to 111 described in FIG. 1 are implemented on the stereo camera 100 except the camera 1401, the camera 1402, the camera 1403, and the camera 1404. Cameras for imaging the circumference of the vehicle are not limited to the four cameras including the camera 1401, the camera 1402, the camera 1403, and the camera 1404. Any one, two, or three of the four cameras may be provided.

Another Exemplary Configuration

Figure 14:
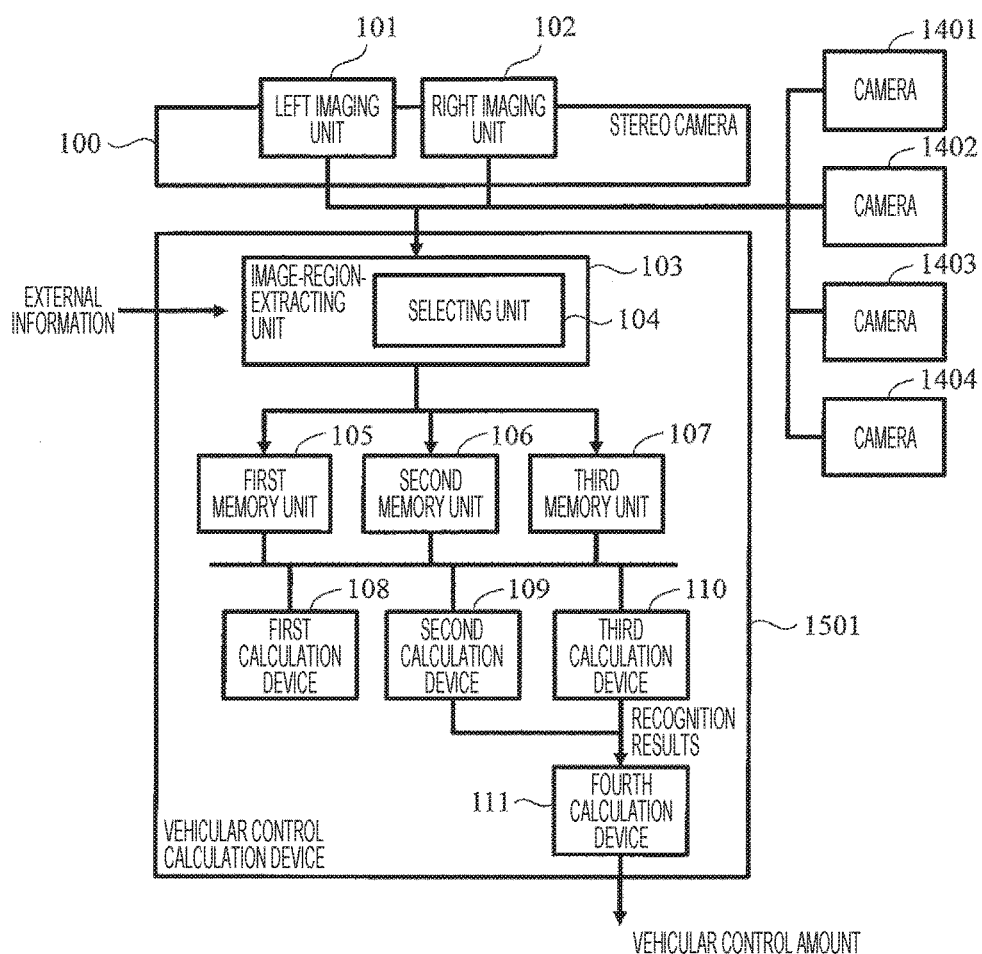
FIG. 14 is a diagram for describing another exemplary configuration of the external-environment-recognizing apparatus according to the second embodiment.

FIG. 14 is a block diagram for describing another exemplary configuration of the second embodiment.

Figure 13:
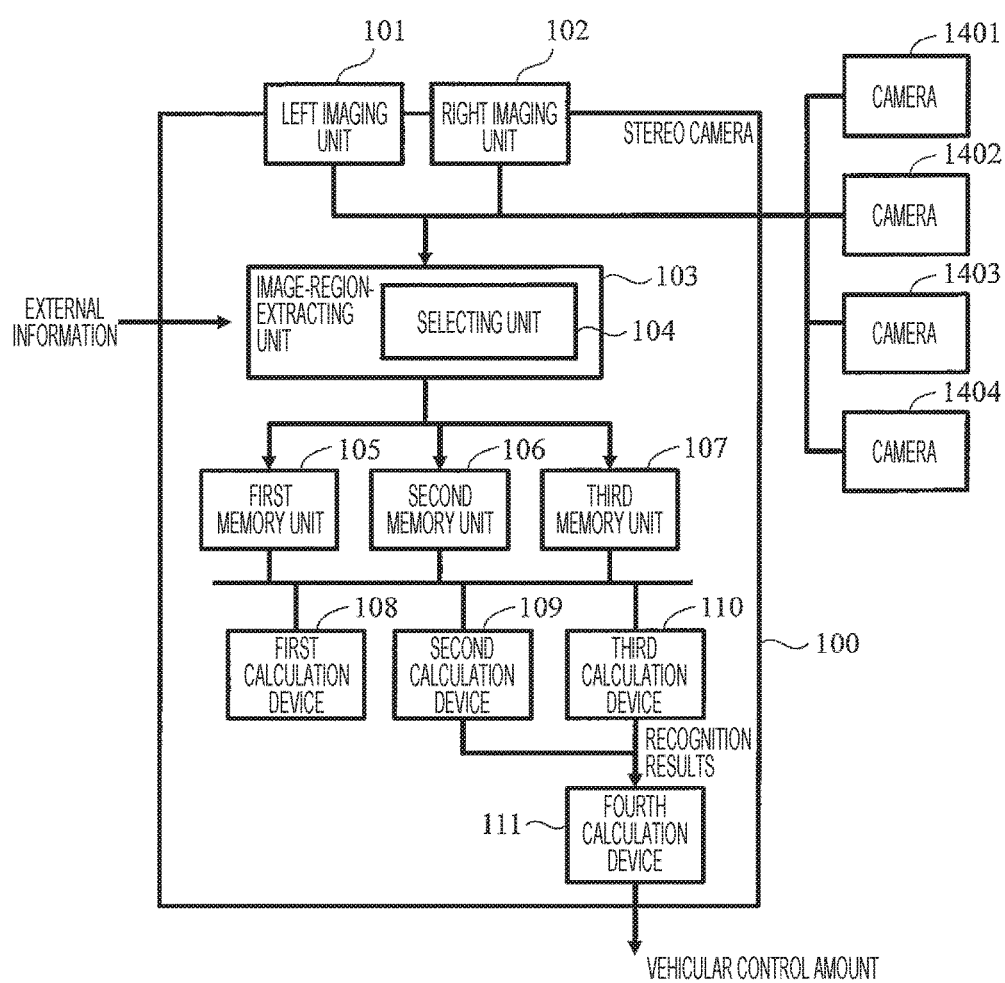
FIG. 13 is a diagram for describing an exemplary configuration of an external-environment-recognizing apparatus according to a second embodiment.

A point different from, the exemplary configuration illustrated in FIG. 13 is in that a configuration of a stereo camera 100 includes only a left imaging unit 101 and a right imaging unit 102 and a configuration including an image-region-extracting unit 103 to a fourth calculation device 111 is provided in a vehicular control calculation device 1501.

Images imaged by the left imaging unit 101 and the right imaging unit 102 of the stereo camera 100 and images imaged by a camera 1401, a camera 1402, a camera 1403, and a camera 1404 are transmitted to the image-region-extracting unit 103 in the vehicular control calculation device 1501.

According to the exemplary configuration, the units 103 to 111 described in FIG. 13 are implemented on the vehicular control calculation device 1501 except the stereo camera 100, the camera 1401, the camera 1402, the camera 1403, and the camera 1404. Totally, six packages including the stereo camera 100, the camera 1401, the camera 1402, the camera 1403, the camera 1404, and the vehicular control calculation device 1501, are provided. The external-environment-recognizing apparatus according to the present invention is not limited to the configuration illustrated in FIG. 13, and, for example, various alterations can be made as the above configuration illustrated in FIG. 14.

The embodiments of the present invention have been described above. The invention is not limited to the above embodiments, and various design alterations may be made without departing from the scope of the spirit of the present invention described in the claims. For example, the above embodiments have been described in detail in order to easily understand the present invention. The present invention is not necessarily limited to including all the configurations having been described above. A part of the configuration in one of the embodiments can be replaced with the configuration in another embodiment. In addition, the configuration in one embodiment can be added to the configuration in another embodiment. Furthermore, with respect to a part of the configuration in each of the embodiments, additions, deletions, and replacements of the other configurations may be made.

REFERENCE SIGNS LIST

100 stereo camera
101 left imaging unit
102 right imaging unit
103 image-region-extracting unit
104 selecting unit
105 first memory unit
106 second memory unit
107 third memory unit
108 first calculation device
109 second calculation device
110 third calculation device
111 fourth calculation device

The invention claimed is:

1. An external-environment-recognizing apparatus configured to recognize an external environment with an image including an outside imaged from a vehicle, the external-environment-recognizing apparatus comprising:
   a plurality of processing units configured to perform image processing to the image;
   a recognition-application-storing unit configured to store a plurality of recognition applications that recognize objects by processing of at least one processing unit of the plurality of processing units, based on classifications of the objects;
   an external-information-acquiring unit configured to acquire external information including at least one of pieces of external environmental information and own vehicle behavior information;
   a selecting unit configured to select at least one recognition application from the recognition-application-storing unit based on the external information, the selecting unit configured to select a processing unit for processing the selected recognition application from the plurality of processing units; and
   a pair of imaging units configured to image a front of the vehicle,
   wherein the plurality of processing units includes:
   a first processing unit configured to perform at least one of processing of image distortion correction and parallax calculation for an image imaged by the pair of imaging units;
   a second processing unit configured to perform processing to the recognition applications at a predetermined processing speed; and
   a third processing unit configured to perform processing to the recognition applications at a processing speed faster than the processing speed of the second processing unit.

2. The external-environment-recognizing apparatus according to claim 1, further comprising:
   an image-region-extracting unit configured to extract at least a partial image region of the image based on the at least one recognition application selected by the selecting unit; and
   a plurality of memory units capable of storing image data in the image region, wherein the selecting unit selects at least one memory unit that stores the image data in the image region from the plurality of memory units in accordance with the selected recognition application.

3. The external-environment-recognizing apparatus according to claim 2,
wherein the external environmental information includes a road classification of a road on which the vehicle travels.

4. The external-environment-recognizing apparatus according to claim 3,
wherein the recognition applications include at least one of pedestrian detection, vehicle detection, lane detection, and road sign recognition.

5. An external-environment-recognizing apparatus configured to recognize an external environment with an image including an outside imaged from a vehicle, the external-environment-recognizing apparatus comprising:
a plurality of processing units configured to perform image processing to the image;
a recognition-application-storing unit configured to store a plurality of recognition applications that recognize objects by processing of at least one processing unit of the plurality of processing units, based on classifications of the objects;
an external-information-acquiring unit configured to acquire external information including at least one of pieces of external environmental information and own vehicle behavior information;
a selecting unit configured to select at least one recognition application from the recognition-application-storing unit based on the external information, the selecting unit configured to select a processing unit for processing the selected recognition application from the plurality of processing units;
an image-region-extracting unit configured to extract at least a partial image region of the image based on the recognition application selected by the selecting unit;
a plurality of memory units capable of storing image data in the image region; and
a lateral pair of imaging units configured to image a front of the vehicle,
wherein the selecting unit selects at least one memory unit that stores the image data in the image region, from the plurality of memory units in accordance with the selected recognition application;
wherein the external environmental information includes a road classification of a road on which the vehicle travels;
wherein the recognition applications include at least one of pedestrian detection, vehicle detection, lane detection, and road sign recognition; and
wherein the plurality of processing units includes:
a first processing unit configured to perform at least one of processing of image distortion correction and parallax calculation for an image imaged by the pair of imaging units;
a second processing unit configured to perform processing to the recognition applications at a predetermined processing speed; and
a third processing unit configured to perform processing to the recognition applications at a processing speed faster than the processing speed of the second processing unit.

6. The external-environment-recognizing apparatus according to claim 5,
wherein in a case where the external-information-acquiring unit acquires the external information including that the vehicle is in motion at a low speed on a narrow street in an urban area, the selecting unit selects the vehicle detection and the pedestrian detection from the plurality of recognition applications, and
the selecting unit selects the first processing unit as a processing unit configured to calculate parallax, selects the second processing unit as a processing unit configured to perform the vehicle detection based on the parallax calculated by the first processing unit, and selects the third processing unit as a processing unit configured to perform the pedestrian detection.

7. The external-environment-recognizing apparatus according to claim 6,
wherein the image-region-extracting unit extracts a left image overlap region and a right image overlap region being regions in which a left image and a right image imaged by the pair of imaging units overlap each other, a left image single region being a region imaged only in the left image, and a right image single region being a region imaged only in the right image,
the first processing unit calculates parallax, using image data in the left image overlap region and image data in the right image overlap region,
the second processing unit performs the vehicle detection based on the parallax, and
the third processing unit performs the pedestrian detection based on each of the pieces of image data in the left image overlap region, the right image overlap region, the left image single region, and the right image single region.

8. The external-environment-recognizing apparatus according to claim 7, further comprising at least one monocular camera configured to image a periphery of the vehicle,
wherein the image-region-extracting unit extracts an image single region from a vehicle periphery image imaged by the monocular camera, and
the third processing unit performs the pedestrian detection based on image data in the image single region.

9. The external-environment-recognizing apparatus according to claim 7,
wherein the plurality of memory units includes:
a first memory unit configured to store the pieces of image data in the left image overlap region and the right image overlap region;
a second memory unit configured to store the pieces of image data in the left image single region and the right image single region; and
a third memory unit configured to store a parallax image having the parallax calculated by the first processing unit.

10. The external-environment-recognizing apparatus according to claim 5,
wherein in a case where the external-information-acquiring unit acquires the external information including that the vehicle is in motion on a superhighway, the selecting unit selects the vehicle detection and the road sign recognition from the plurality of recognition applications, and
the selecting unit selects the first processing unit as a processing configured to calculate parallax, selects the third processing unit as a processing unit configured to perform the vehicle detection based on the parallax calculated by the first processing unit, and selects the second processing unit as a processing unit configured to perform the road sign recognition.

11. The external-environment-recognizing apparatus according to claim 10, wherein the image-region-extracting unit extracts a left image overlap region and a right image overlap region being image regions in which a left image and a right image imaged by the pair of imaging units overlap each other, a left image partially overlap region being an image region ranging from a region imaged only in the left image to a region imaged with an overlap with the right image, and a right image partially overlap region being an image region ranging from a region imaged only in the right image to a region imaged with an overlap with the left image, the first processing unit calculates parallax, using pieces of image data in the left image overlap region and the right image overlap region, the third processing unit performs the vehicle detection based on the parallax, and the second processing unit performs the road sign recognition based on pieces of image data in the left image partially overlap region and the right image partially overlap region.

12. The external-environment-recognizing apparatus according to claim 11, wherein the plurality of memory units includes:

a first memory unit configured to store the pieces of image data in the left image overlap region and the right image overlap region;

a second memory unit configured to store the pieces of image data in the left image partially overlap region and the right image partially overlap region; and a third memory unit configured to store a parallax image having the parallax calculated by the first processing unit.

* * * * *